United States Patent
Beloussov et al.

(10) Patent No.: US 9,069,591 B1
(45) Date of Patent: Jun. 30, 2015

(54) PATCHING HOST OS STRUCTURES FOR HARDWARE ISOLATION OF VIRTUAL MACHINES

(75) Inventors: Serguei M. Beloussov, Singapore (SG);
Maxim A. Kuzkin, Moscow (RU);
Andrey A. Omelyanchuk, Moscow (RU); Stanislav S. Protassov, Moscow (RU); Alexander G. Tormasov, Moscow (RU)

(73) Assignee: Parallels IP Holding GmbH, Schaffhausen (CH)

( * ) Notice: Subject to any disclaimer, the term of this patent is extended or adjusted under 35 U.S.C. 154(b) by 944 days.

(21) Appl. No.: 12/879,677

(22) Filed: Sep. 10, 2010

Related U.S. Application Data

(60) Provisional application No. 61/241,043, filed on Sep. 10, 2009.

(51) Int. Cl.
*G06F 9/455* (2006.01)
*G06F 3/06* (2006.01)

(52) U.S. Cl.
CPC ............ *G06F 9/45533* (2013.01); *G06F 9/455* (2013.01); *G06F 2009/45579* (2013.01); *G06F 3/0664* (2013.01)

(58) Field of Classification Search
None
See application file for complete search history.

(56) References Cited

U.S. PATENT DOCUMENTS

| | | | |
|---|---|---|---|
| 4,847,754 A * | 7/1989 | Obermarck et al. | 718/104 |
| 7,210,014 B2 * | 4/2007 | Drasnin et al. | 711/163 |
| 7,979,869 B2 * | 7/2011 | Manczak et al. | 719/327 |
| 8,327,353 B2 * | 12/2012 | Traut | 718/1 |
| 2007/0276879 A1 * | 11/2007 | Rothman et al. | 707/202 |
| 2009/0031303 A1 * | 1/2009 | Frank | 718/1 |
| 2009/0113430 A1 * | 4/2009 | Riley | 718/101 |
| 2009/0210888 A1 * | 8/2009 | Lee et al. | 719/321 |
| 2010/0250892 A1 * | 9/2010 | Logan et al. | 711/173 |

* cited by examiner

*Primary Examiner* — Eric C Wai
(74) *Attorney, Agent, or Firm* — Bardmesser Law Group

(57) ABSTRACT

A system and method for implementing direct attachment of VMs, implemented on a computer system, to hardware devices attached to the computer system. Direct attachment architecture is implemented. The direct attachment is an exclusive dedication of a hardware device to a VM, where a particular hardware device is assigned to a particular VM. When the VM is not activated, the hardware device can be re-assigned to another VM. At system start up, hardware devices are masked from a host OS of a computer system and are automatically attached to the assigned VMs.

13 Claims, 3 Drawing Sheets

PATCHING HOST OS STRUCTURES FOR HARDWARE ISOLATION OF VIRTUAL MACHINES

CROSS-REFERENCE TO RELATED APPLICATION

This application is a non-provisional application of U.S. Provisional Patent Application No. 61/241,043, filed Sep. 10, 2009, entitled HARDWARE DEDICATION FOR VIRTUAL MACHINES AND VIRTUAL ENVIRONMENTS, which is incorporated by reference herein in its entirety.

BACKGROUND OF THE INVENTION

1. Field of the Invention

The present invention is related to virtualization technology, and more particularly, to dedicating hardware resources for supporting Virtual Machines (VMs).

2. Description of the Related Art

The industry trend of virtualization and isolation of computer system resources presents two major challenges—virtualization at software level and virtualization at hardware level. A Virtual Machine (VM) is a type of an isolated Virtual Environment where multiple VMs can run on the same physical machine simultaneously. Each VM instance has a set of its own software components and uses hardware modules of the physical machine where the VM resides.

Virtualization allows running a number of VMs on the same physical machine. Examples of conventional virtualization solutions are virtual systems by VMware™, Parallels Software International, Inc., Microsoft Virtual Server, Microsoft/Citrix Terminal Server, Virtuozzo™ by SWSoft (Parallels), Xen systems by XenSource, Solaris Zones, etc. All of these systems, however, provide only limited support for a low level (i.e., hardware) virtualization.

With Virtual Machine (VM) technology, a user can create and run multiple virtual environments on a physical server at the same time. Each virtual environment (such as VM), requires its own operating system (OS) and can run applications independently. The VM software provides a layer between the computing, storage, and networking hardware and the software that runs on it.

Typically, there are multiple VMs created on a host operating system. In such system, some resources of the host operating system can be isolated and allocated for running each of the VMs. An example of this type of system is a computing environment provided by VMware™. The VMware™ solution provides standardized isolated secured computing environments.

This product is typically used as an enterprise-level solution, where a number of VMware™ Virtual Machines are distributed throughout the computer system. However, the VMware™ solution does not provide an adequate solution for processing hardware access requests from the VMs. The requests are processed in multiple operating environments. This overloads computational resources of a VM to a point where advantages of virtualization can be practically diminished.

A conventional architecture employed in virtualization solutions includes a hardware-based computational system where VMs and a host OS are implemented. In order for the VMs to use hardware devices, a virtual device and a virtual device driver are installed. The virtual driver provides VM access to a hardware device used by the VM. The driver has to relay and process I/O requests to the VM.

Hardware devices typically used by VMs are a disk storage device, a video card, a network card, a CPU, etc. This approach overloads computational resources (i.e., creates an overhead) of a VM to an unacceptable degree. This issue is overcome by Intel™ hardware solution Vt-x. The Vt-x technology provides VM code execution using direct access to processor resources. Current technologies such as Vt-d (Vt-d2 and Vt-c) also allow a VM to employ video and network cards using a direct device access approach. However, these technologies are expensive and inefficient, since they still cause overloading of the VMs. Also, the Vt-d specification does not describe how to prevent the host OS from "discovering" a device or how to "take it away" from the host OS.

Another approach, such as Xen, is creation of specific operating system with possibility of distribution hardware resources between virtual hosts where the privileged host may be used as a host OS and other hosts may be used as guest OSes. Here, a hypervisor distributes hardware resources between hosts during startup based on options loaded during system boot up.

Therefore, it is desirable to have a method for using hardware devices with the VMs without overloading available computational resources.

SUMMARY OF THE INVENTION

The present invention is intended as a method and system for dedicating hardware resource for supporting Virtual Machines (VMs) that substantially obviates one or several of the disadvantages of the related art.

In one aspect of the invention, there is provided a system and method for implementing direct attachment of a VM to a hardware device. In one aspect of the invention, there is provided a method for dedication of hardware devises used by VMs. According to an exemplary embodiment, a problem of overloading the VMs is solved by direct attachment architecture. The direct attachment is an exclusive dedication of a hardware device to a VM. In other words, a particular hardware device is assigned to a particular VM. When the VM is not activated, the hardware device can be re-assigned to another VM.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
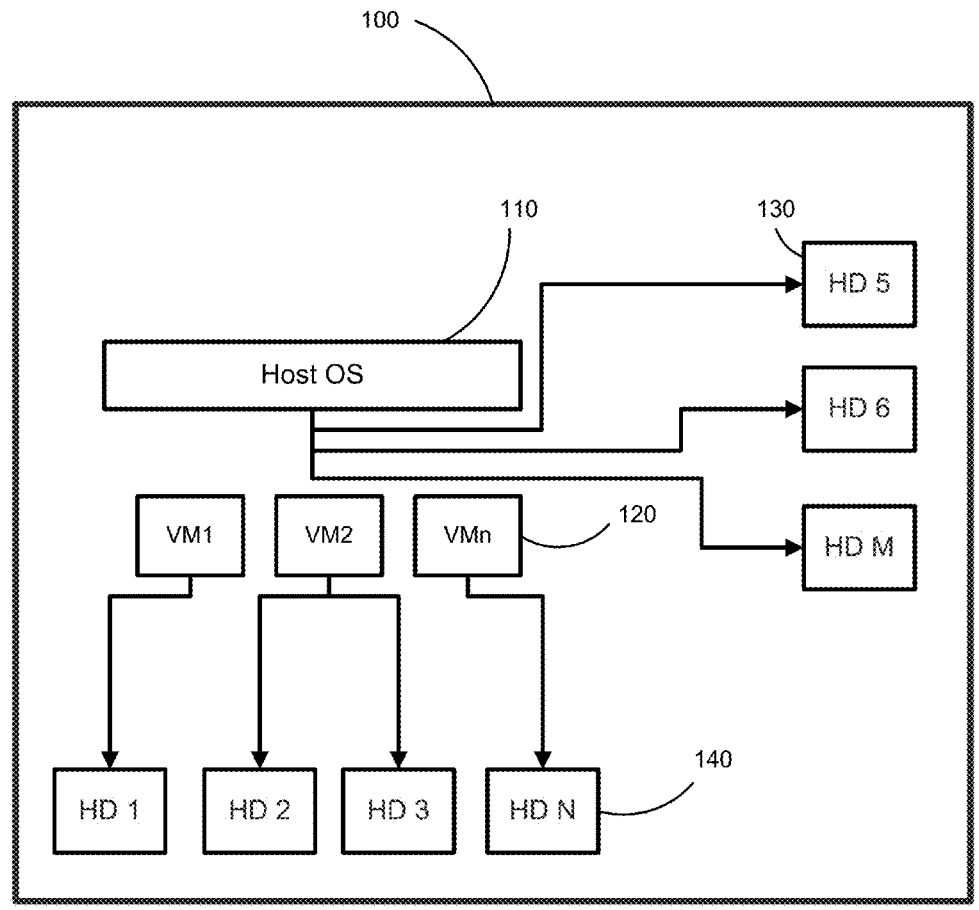
FIG. 1 illustrates assignment of hardware devices to VMs in accordance with an exemplary embodiment.

Reference will now be made in detail to the preferred embodiments of the present invention, examples of which are illustrated in the accompanying drawings.

In one aspect of the invention, there is provided a system, method and computer program product for dedication of hardware devises used by VMs. According to the exemplary embodiment, a problem of overloading the VMs is solved by direct attachment architecture. The direct attachment uses dedication of a hardware device to a VM. In other words, a particular hardware device is assigned to a particular VM. When the VM is not activated, the hardware device can be assigned to another VM. However, some hardware devices do not need to be re-assigned to the other VMs. For example, if a VM is used on a user workstation, a keyboard does not need to be re-assigned back to the host OS, since the user works with applications installed on the guest OS of the VM.

The difficulty is often in the nature of the drivers used to interface to the hardware devices. For instance, in a system that has two discrete video cards, a single driver will "grab" both video cards and will control them both. Since drivers are typically closed-source entities, there is no API to tell the driver to "release" one of the cards. Another difficulty is that the BIOS, to which the host OS looks for discovering which hardware devices are present in the system, is normally not easily altered. Even manual alteration of the BIOS that would prevent the host OS from "noticing" an existence of a hardware device (e.g., peripherals, memory or some portion of it, etc.) is not an easy task. To do this, as one example, the protocol used by the host OS to talk to the drivers (such as PnP) needs to be intercepted, understood and something substituted into it in order to "trick" the host OS that the hardware device is not actually there or cannot be talked to.

In one embodiment, I/O operations related to dedicated hardware are processed in the guest OS, but if there is a need to use the dedicated hardware in other environments, results can be passed to the host OS or other guest OSes, e.g., via a virtual port associated with the hardware device in other environments. In another embodiment, a device that cannot be simultaneously used by different execution environments (i.e., VMs) is assigned to one VM at a time. Such a device can be a mouse, a keyboard, a port of a video card, etc.

According to the exemplary embodiment, when a VM (or a host OS) is launched, a hardware device assigned to the VM comes under a control of the VM. A CPU can be assigned to a VM in the same manner. In one embodiment of the invention, a dedicated hardware device can be released when the VM is switched off and thus can be used by other VMs without any loss of productivity of the computing system as a whole, because other VM can control the device directly. Thus, there is no need to emulate direct access to the device by the host OS or hypervisor means.

Thus, a soft or a hard partition of the VM is created. A modern computer system can have, e.g., up to four CPU cores. If two of the cores are dedicated to one VM, they cannot be used by other VMs. Management of assigned hardware resources is a challenging task. For example, in certain configurations two or more video cards installed on the same system can only function under control of one driver. Therefore, resources of different video cards their resources cannot be assigned among the multiple VMs because appropriate driver should support releasing of one card instance.

However, if the video cards are not "shown" to the host OS at the time of its launch, and instead, the host OS can be given a generic interface that does not depend on a type and a number of the installed video cards, the video cards' resources can be used by different VMs. If a hardware device is implemented as a multi-channel device that works with numerous drivers, some channels can be dedicated to common use and some channels can be assigned to the VMs using direct attachment technology. Herein channels required for dedication to certain VM may be masked from the host OS and other guest OSes. In one embodiment of the invention the dedicated channel may be forbidden in certain environments, e.g., by using blocking technology similar to used in firewall or antivirus software. As one option the device is masked by installing a special driver that takes control of the device, and prevents the host OS from working with that device, and also prevents other drivers from working with it.

For example, hardware devices in host OS can operate in a following manner: two drivers—two devices; two drivers—one device (e.g., one driver uses primarily access to the device and the second driver is used for interfacing software and the first driver); one driver—two devices. This can be particularly beneficial for computationally intensive applications, such as video games or graphics processing. Hardware switching between the VMs is done very infrequently, while the main load is placed on the VMs between the switches (for example, for graphics rendering or calculating physical models).

According to the exemplary embodiment, hardware resources are masked from the host OS (i.e., not shown to the host OS) at start up. Thus, the host OS cannot take control over the hardware resources. The hardware resources can be hidden from the host OS using hardware means. For example, a signal, indicating that a hardware device is turned off, can be sent to the host OS. The hardware resources can masked out using BIOS (i.e., using programming means for disconnecting devices from the system).

Usually BIOS can auto detect and configure a port. It does not disable the ports as a default setting. If the port is disabled in BIOS (by default), the host OS cannot use this port after startup even if plug-and-play devices use this port. However, the port can be activated and a corresponding device can be connected to the port by a device manager running in a virtual environment.

In some cases preferred port activation in BIOS is required. If a device is disconnected in BIOS, it cannot be used again. In one embodiment, BIOS initialization procedures can be used for some devices (for example, for starting controller, or for detecting available devices). The BIOS employs procedures for initialization, device detection and numeration.

According to the exemplary embodiment, device detection procedure can be turned off for some of the devices. A device or a port can be set as "disabled" (as opposed to a default "auto" setting). Then, the device cannot be detected at system initialization. Alternatively, device detection function can be removed from BIOS program code for the devices intended for direct access by a VM. The VM can have virtual BIOS or EFI having special access settings allowing access to a particular device. Additionally, detection of plug-and-play devices can be turned off in BIOS and in Host OS.

The description of the hardware device is added to the configuration of the VM. Thus, the guest OS "finds" the physical device in the same manner as it would find a virtual device.

All modern operating systems look to the BIOS/EFI and the tables therein, to identify available devices. ACPI is an example of such a table—if the device were to be listed there as unavailable/nonexistent, then the OS would not show it in the Device Manager. As such, there would be no access to the device from the host OS.

For example, see http:**en.wikipedia.org/wiki/Conventional_PCI, PCI provides separate memory and I/O port address spaces for the x86 processor family, 64 and 32 bits, respectively. Addresses in these address spaces are assigned by software. A third address space, called the PCI Configuration Space, which uses a fixed addressing scheme, allows software to determine the amount of memory and I/O address space needed by each device. Each device can request up to six areas of memory space or I/O port space via its configuration space registers.

In a typical system, the firmware (or operating system) queries all PCI buses at startup time (via PCI Configuration Space) to find out what devices are present and what system resources (memory space, I/O space, interrupt lines, etc.) each needs. It then allocates the resources and tells each device what its allocation is.

The PCI configuration space also contains a small amount of device type information, which helps an operating system choose device drivers for it, or at least to have a dialogue with a user about the system configuration.

In an exemplary embodiment of the invention, the corresponding stopper driver in the host OS may isolate the device (i.e., the device as an operating system concept, not as a physical device) from the host operating system by treating requests to the device, e.g., visible from the HOS, such as device is constantly busy or inaccessible. The stopper driver also can handle interrupts relating to the hardware device (typically, any attempts to work with the hardware device directly). To give a device to a guest OS, it is necessary to ensure that no interrupts other than those relating to the guest OS can reach the device. This cannot be the case if the device is visible to the host OS as a working device, and the host OS therefore works with that device. The stopper driver (which replaced the previously loaded driver in the device—again, here, the "device" is an OS concept, such as devices displayed in the "Device Manager" menu, not limited by the physical electronics, and the stopper driver will now service the device) can process the interrupt, and can forward it to the driver in the guest OS. As another option, the driver in the guest OS, under control of the hypervisor, can process the interrupt.

The stopper driver provides an ISR (interrupt service routine) to recognize the nature of the interrupt. It will then inform the host OS that the interrupt has been handled (since otherwise, the host OS can crash due to receiving an interrupt from an unknown device). The stopper driver will then send a message to the guest OS to asynchronously send the interrupt to the guest OS. The stopper driver will also mask the interrupt to ensure that a second interrupt will not come before the interrupt is processed in the guest OS.

Another driver has to be installed in the VM to work with the device. Any requests from the host OS will be ignored. The stopper driver will intercept any interrupts generated from the guest OS (even though the stopper driver itself runs under the host OS).

In other embodiments, dynamic patching of BIOS or patching an EFI is contemplated, such that the device can become invisible to the HOS. A hypervisor can intercept access attempts to the hardware device from the host OS. The BIOS or EFI can be patched dynamically while the system boots up. Also, the host OS can be modified on-the-fly to remove some devices from the list of devices it is managing.

By way of example, the BIOS or EFI can be patched if it is static (e.g., modify the BIOS to ignore a device, but still tell the hypervisor or VMM that a device exists), or it can be done by a program that is launched immediately upon startup and modifies the BIOS accordingly.

Alternatively, the hardware devices can be excluded from a list of visible devices used for mounting the devices at the OS launch. An OS memory can also be hidden in the same manner. Then, the operating memory can be used by the VMs using the direct attachment mechanism (rather than, for example, through the MMU or host OS memory allocation mechanisms that the host OS controls).

FIG. 1 illustrates assignment of hardware devices to VMs in accordance with the exemplary embodiment. The VMs 120 are implemented on a computer system 100 and run under host OS 110. Hardware devices 140 are dedicated (i.e., assigned) to the VMs 120 respectively. Hardware devices 130 remain under control of the host OS 110. This arrangement requires performing operations for assigning the hardware devices 140 to VMs 120, since the host OS 110 automatically takes control of all of the available hardware devices at a system start up.

Figure 2:
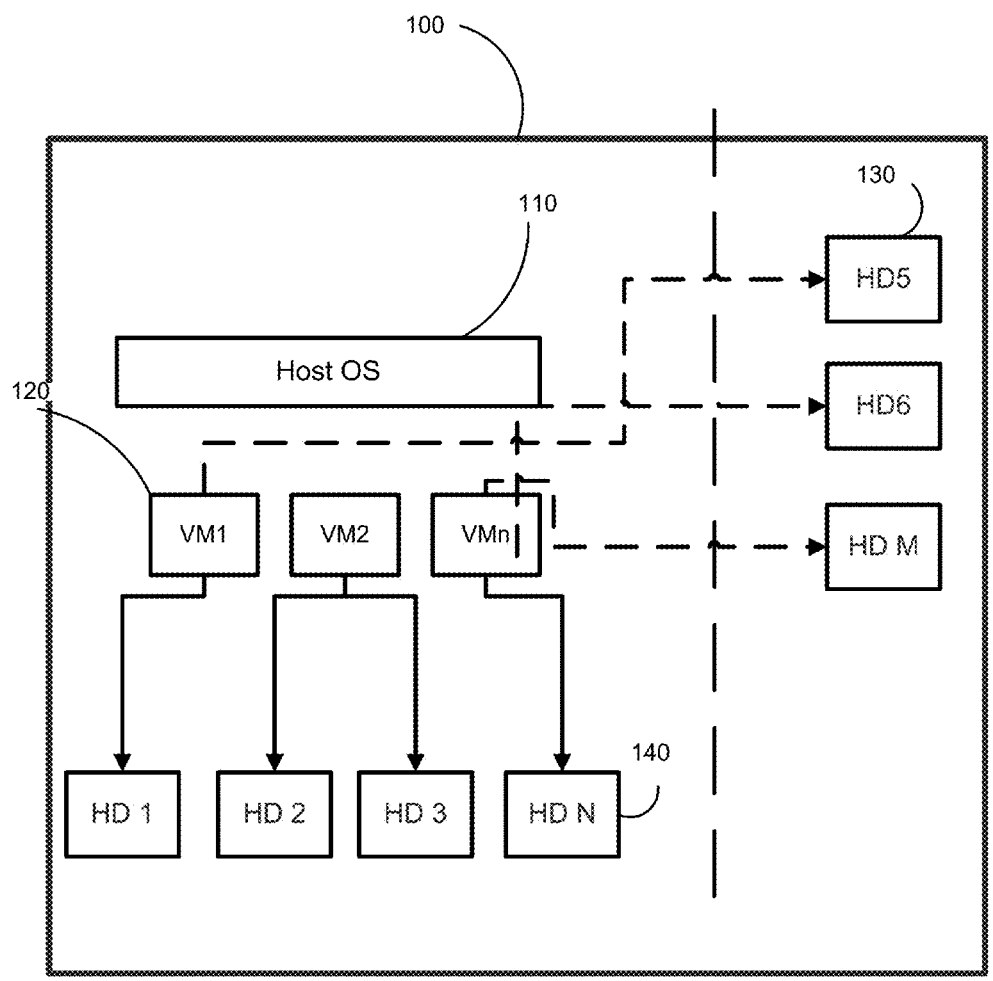
FIG. 2 illustrates a hardware masking method in accordance with the exemplary embodiment.

In order to overcome the problem of the host OS taking control over the hardware devises at start up, hardware masking from the host OS is implemented. FIG. 2 illustrates hardware masking method in accordance with the exemplary embodiment. In this embodiment, the hardware devices 130 are masked from host OS 110 at a start up. Thus, the host OS 110 does not take control of the hardware devices 130 and they can be automatically assigned to VMs 140.

An address space of the computer system 100 is allocated in such a way that the host OS 110 does not have access to a pre-defined (at startup) set of addresses of the hardware devices 130 and does not use the corresponding hardware devices. Thus, VMs 120 are given access to the addresses of the devices 130. The addresses of the devises 130 are written in a direct form (i.e., not accessed by reference) and the VMs 120 can access them bypassing access verification procedures enforced by the host OS 110.

In the exemplary embodiment depicted in FIG. 2, guest OSs of the VMs 120 perform a search for appropriate plug-and-play devices and automatically installs them at start up. In one embodiment, hardware devices can be connected to the host OS via a hypervisor that controls all the VMs implemented under the host OS. In this arrangement, the hypervisor cannot detect the hardware devices and the hardware devices are accessed by the VMs directly (i.e., not via the hypervisor).

Devices dedicated to a VM are not available after the VM is turned off. For example, a video card given to the VM cannot be connected to a system bypassing the VM. In one embodiment, another VM having a direct access to the video card can be launched. In yet another embodiment, the VM having a direct access to the vide card determines access policies to the video card by other VMs. Dynamic isolation can be used by the hypervisor to exclude the hardware device from the host OS's "universe" of devices with which it interface.

According to the exemplary embodiment, some hardware resources are permanently dedicated to the VMs and are made unavailable to the host OS or the hypervisor. A dedicated device becomes unavailable after a corresponding VM is turned off. Alternatively, the device is became directly connected to another VM without using hypervisor or host OS means, or back to the host.

In another exemplary embodiment, hosted VM monitors (VMMs) are implemented. The VMMs allow to mask out hardware devises from the host OS, by means of patching BIOS, using special support in hardware chipsets, by on-the-fly BIOS patching or by patching OS detection. An example of changing programmable code in BIOS is provided in U.S. Ser. No. 10/725,016, filed 2 Dec. 2003 and entitled "System, Method and Computer Program Product for On-The-Fly Patching of Executable Code. Host OS and hypervisor restrict some ports from being used by VMs or by Host OS, with the exception of the VM to which these ports are assigned.

Alternatively, host OS means (drivers/modules) can be used to reserve hardware resources at start up and provide them to VMs when requested. If not requested, the hardware resources are held by the host OS permanently. The hardware resources can be masked out from the host OS by a hypervisor that reads configuration data from BIOS or form configuration file and masks some hardware. Alternatively, the hypervisor can give the devices to the host OS and the host OS assigns the devices to the VMs.

Extensible Firmware Interface (EFI) can be used as another option of accessing system hardware by a VM. The Unified EFI (UEFI) specification (previously known as the EFI specification) defines an interface between an operating system and platform firmware. The interface consists of data tables that contain platform-related information, boot service calls, and runtime service calls that are available to the operating system and its loader. These provide a standard environment for booting an operating system and running pre-boot applications.

The UEFI specification was primarily intended for the next generation of IA architecture-based computers, and is an outgrowth of the "Intel® Boot Initiative" (IBI) program that began in 1998. Intel's original version of this specification was publicly named EFI ending with the EFI 1.10 version. In 2005 the Unified EFI Forum was formed as an industry-wide organization to promote adoption and continue the development of the EFI specification. Using the EFI 1.10 specification as the starting point, this industry group released the follow up specifications renamed Unified EFI.

According to the exemplary embodiment, the hardware devices are assigned and de-assigned to and from the VMs. Assignment and de-assignment can be implemented using policies and rules, as well as by user request. The hardware device can be de-assigned upon stopping of the VM. Then, the device becomes unavailable to the system or it can be re-assigned to another VM. Alternatively, it can be done on the fly, without stopping the VM or the host OS.

Those skilled in the art will appreciate that the proposed embodiment allows for dedication of hardware to the VMs reducing the computational overhead placed on the VMs.

Figure 3:
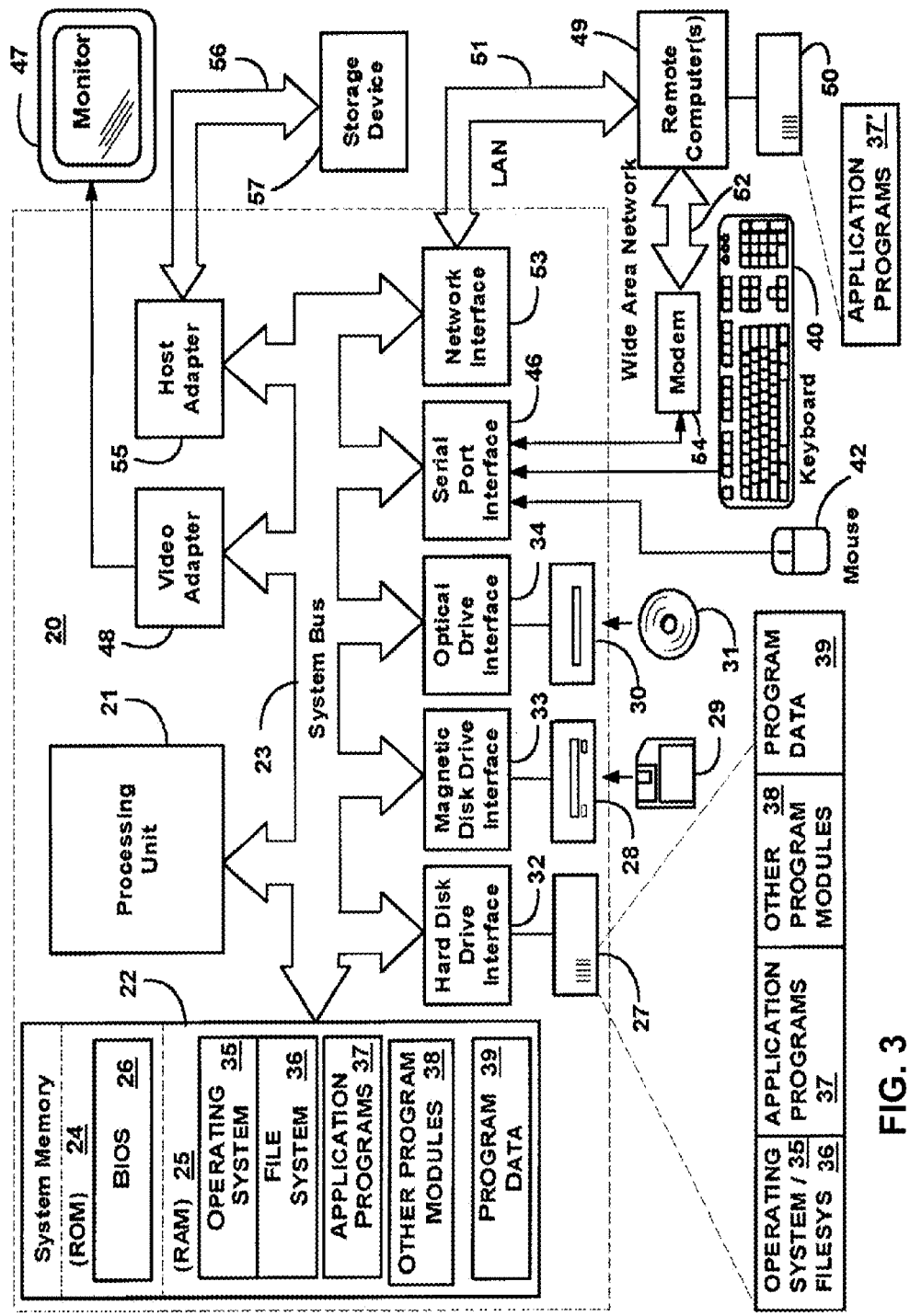
FIG. 3 illustrates a schematic of an exemplary computer system on which the invention can be implemented.

With reference to FIG. 3, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for masking hardware devices from a host OS of a computer system and assigning the hardware devices to the VMs implemented on the computer system.

It should also be appreciated that various modifications, adaptations and alternative embodiments thereof may be made within the scope and spirit of the present invention. The invention is further defined by the following claims.

What is claimed is:

1. A method for assigning a dedicated hardware device to a Virtual Machine (VM), the method comprising:
   implementing at least one VM with a guest OS, running under control of a Virtual Machine Monitor (VMM) on a computer system with a host operating system (OS);
   isolating a hardware device from the host OS;
   assigning the hardware device to the VM,
   wherein the VM takes exclusive control of the hardware device by bypassing the VMM when interfacing with the hardware device;
   the isolation of the hardware device comprising allocation of devices of the computer system so that the host OS operative access to the hardware device is essentially limited,
   wherein the isolation of the hardware device is provided at boot time by a hypervisor (a) patching of BIOS of the computer system or (b) patching an EFI of the computer system, and
   wherein the hardware device is visible to the host OS, but becomes inactive for the host OS.

2. The method of claim 1, further comprising shutting down the VM to which the hardware device is dedicated, and making the hardware device visible to the host OS.

3. The method of claim 1, wherein the hardware device is a plug-and-play device, and wherein the guest OS installs plug-and-play drivers for connecting the VM to the hardware device.

4. The method of claim 1, wherein the access to hardware device for detection existence of the hardware device is allowed to the host OS.

5. A method for assigning a dedicated hardware device to a Virtual Machine (VM), the method comprising:
   implementing at least one VM with a guest OS on a host OS of a computer system;
   isolating a hardware device from the host OS;
   assigning the hardware device to the VM,
   wherein the VM takes exclusive control of the hardware device;
   the isolation of the hardware device comprising allocation of devices of the computer system so that the host OS operative access to the hardware device is essentially limited,
   wherein the isolation of the hardware device is provided by (a) patching of BIOS of the computer system or (b) patching an EFI of the computer system, and
   wherein the hardware device is visible to the host OS, but becomes inactive for the host OS,
   wherein, after the patching of the BIOS or the patching of the EFI, structures of the host operating system are patched, including a table of devices or a registry of the host operating system, thereby making the hardware device absent or inactive.

6. A virtualization system for allocating dedicated hardware devices, the system comprising:
   a computer system having a host OS and a Virtual Machine Monitor (VMM);
   at least one Virtual Machine (VM) implemented under control of the VMM;
   at least one hardware device connected to the computer system,
   wherein the hardware device is masked out from the host OS and the VM takes exclusive control of the hardware device at start up by bypassing the VMM when interfacing with the hardware device;
   the hardware device is masked by allocation of address space of the computer system so that the host OS does not have access to an address of the hardware device,
   wherein the masking of the hardware device is provided at boot time by a hypervisor (a) patching of BIOS of the computer system or (b) dynamically patching an EFI of the computer system.

7. A method for assigning a dedicated hardware device to a Virtual Machine (VM), the method comprising:
   implementing at least one VM with a guest OS on a host OS of a computer system;
   isolating a hardware device from the host OS;
   assigning the hardware device to the VM,
   wherein the VM takes exclusive control of the hardware device;
   the isolation of the hardware device comprising allocation of the device's address space so that the host OS does not have access to the hardware device, including patching structures of the host operating system at boot time, including patching a table of devices or a registry of the host operating system, thereby making the hardware device absent or inactive to the host OS,
   wherein the isolation of the hardware device is provided by a stopper driver which makes device non-accessible to the host OS processes.

8. The method of claim 7, further comprising using a dedicated driver to make the hardware device inaccessible to the host OS.

9. The method of claim 8, wherein, upon attempting to access the hardware device, the host OS receives a "busy" indication from the dedicated driver.

10. The method of claim 7, wherein the exclusive control is given to the VM at start up.

11. The method of claim 7, wherein the exclusive control is given to the VM on-the-fly, while both the host OS and the VM are running.

12. The method of claim 7, wherein the isolation comprises masking the hardware device from the host OS.

13. A method for assigning a dedicated hardware device to a Virtual Machine (VM), the method comprising:
   implementing at least one VM with a guest OS on a host OS of a computer system;
   masking a hardware device from the host OS;
   assigning the hardware device to the VM for direct access,
   wherein the VM takes exclusive control of the hardware device at start up and bypasses access verification procedures enforced by the host OS;
   the masking of the hardware device comprising allocation of address space of the computer system so that a device access procedure of the host OS is unaware of the hardware device,
   wherein the hardware device is excluded from a list of visible devices used for mounting the devices at the host OS launch by boot-time patching structures of the host operating system, including patching a table of devices or a registry of the host operating system, thereby making the hardware device absent or inactive to the host OS.

* * * * *